Patented Aug. 23, 1932

1,873,606

UNITED STATES PATENT OFFICE

WERNER LANGE AND MAX RAECK, OF DESSAU-ZIEBIGK IN ANHALT, GERMANY, ASSIGNORS TO GENERAL ANILINE WORKS, INC., OF NEW YORK, N. Y., A CORPORATION OF DELAWARE

SECONDARY DISAZO DYES

No Drawing. Application filed April 23, 1931, Serial No. 532,390, and in Germany May 28, 1930.

Our present invention relates to a new process of manufacturing secondary disazo dyes.

One of its objects is a method to provide dyes of this kind dyeing regenerated cellulose bright and even tints.

Additional objects are the new dyes obtainable according to the process.

In German patent specification No. 411,467, dated August 18, 1922, are, inter alia, described secondary disazo dyes which are obtained by coupling diazo compounds from monoacidylated para-phenylene-diamine or the substitution products thereof or the corresponding para-nitranilines with any azo component, splitting off the acidyl group or reducing the nitro group, further diazotizing and coupling with any end component. The dyes thus prepared are intended to be utilized in silk dyeing and are distinguished by a good fastness to water and an excellent dischargeability.

This invention is based on the observation that nearly all dyes of the said classes have a certain levelling power on regenerated cellulose. But those dyes are distinguished by a perfectly clear tint and above all by a good fastness to light and a good levelling power on artificial silk tending to be dyed unevenly, which contain as middle component a 1.4-diamino-sulfonic acid of the benzene series and as end components amino, alkylamino or arylamino derivatives of the benzene or naphthalene series which, after coupling, can no longer be diazotized, the azo group entering in ortho-position to the free or substituted amino group or in para-position to the substituted amino group, and of which at least one end component is a 2-amino-, 2-alkylamino-, or 2-arylamino-8-hydroxynaphthalene-6-sulfonic acid coupled in an acid medium.

Thus, our new dyes may be represented by the general formula

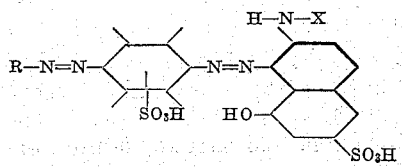

wherein R means a substituted or unsubstituted amino compound of the benzene or naphthalene series, wherein the benzene nucleus of the middle component may be substituted and wherein X means H, alkyl or aryl.

The shades obtainable with these dyes are reddish-blue to greenish-blue. All of the dyes are considerably faster to light than the analogous dyes with end components, which are coupled in ortho- or para-position to a hydroxyl group. This effect could not be seen or derived from the specification above referred to. The observation on which the process claimed is based, shows a quite new, unexpected and, at the same time, important technical progress, since blue dyes of this clarity of tint and a fastness to light, which approaches that of the best substantive blue dyes of commerce, have hitherto been unknown for regenerated cellulose.

The following examples illustrate the invention, the parts being by weight:

*Example 1.*—The diazo compound prepared in known manner from 21.8 parts of 1-amino-4-nitro-benzene-2-sulfonic acid is introduced into an acid suspension of 23.9 parts of 2-amino-8-hydroxynaphthalene-6-sulfonic acid, which has been made by dissolving the acid with sodium carbonate in water and precipitating with acetic acid, and the whole is stirred, while adding an excess of sodium acetate, until the diazo compound has disappeared. The mass is then rendered alkaline by means of sodium hydroxide, heated to 60° C. and, after addition of about 15 parts of sodium sulfide, stirred until the nitro compound has been transformed into the amino compound which is precipitated by addition of sodium chloride. The amino-azo dye is dissolved in about 1000 parts of water and diazotized in the usual manner, while cooling, with hydrochloric acid and about 5 parts of sodium nitrite; then a suspension of 2-amino-8-hydroxynaphthalene-6-sulfonic acid in acetic acid in an amount calculated upon the consumption of sodium nitrite during the second diazotization and prepared as above indicated, and sodium acetate are added thereto and the whole is stirred until the diazo compound can no longer be detected. The product is then rendered alkaline by means of sodium carbonate and the disazo dye is separated by means of sodium chloride; it is purified by dissolving in water and again salting out in the presence of an alkali.

The dye dyes cellulose regenerated from viscose and cotton very vivid greenish-blue tints of good fastness to light.

As free acid it corresponds to the formula

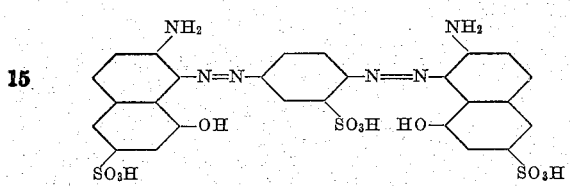

By using for the second development instead of the 2-amino-8-hydroxynaphthalene-6-sulfonic acid a corresponding quality of 2-methylamino-naphthalene-7-sulfonic acid, a very similar dye is obtained.

*Example 2.*—26 parts of 1-methoxy-2-acetylamino-5-aminobenzene-4-sulfonic acid are diazotized in an aqueous suspension in the usual manner with hydrochloric acid and 6.9 parts of sodium nitrite. The diazo compound obtained is separated from the liquid and introduced into an acid solution of 31.5 parts of 2-phenylamino-8-hydroxynaphthalene-6-sulfonic acid, prepared by dissolving it together with sodium carbonate in water and acidifying the solution with acetic acid, and an excess of sodium acetate. The whole is stirred until the diazo compound has disappeared. Then so much of sodium hydroxide is added that, after neutralization, 2% thereof is contained in the liquid, and the whole is boiled for ¾ hours in a reflux apparatus. After neutralization of the excess of alkali with hydrochloric acid, the dye is precipitated by addition of sodium chloride and separated from the liquid. The dye is redissolved in about 1000 parts of water an diazotized in the cold, as usual, with hydrochloric acid and sodium nitrite. Then a suspension of 23.7 parts of 2-methylaminonaphthalene-7-sulfonic acid, prepared by dissolving the acid in sodium carbonate solution and acidifying with acetic acid, and an excess of sodium acetate are added thereto. The whole is again stirred until the diazo compound has disappeared. It is then rendered alkaline with sodium carbonate and filtered by suction without addition of salt. The dye can be purified by mixing it with water and again filtering by suction. It dyes cotton and cellulose regenerated from viscose uniform greenish-blue tints.

As free acid it corresponds to the formula

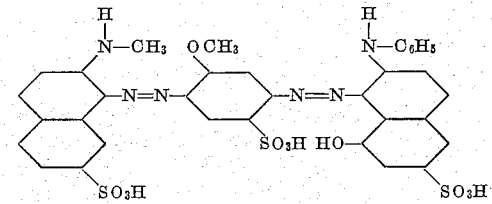

*Example 3.*—26 parts of 5-amino-2-acetylamino-1-methoxybenzene-4-sulfonic acid are diazotized in an aqueous suspension at 5° C.-8° C. with 22 parts of hydrochloric acid of 20° Bé. and 6.9 parts of sodium nitrite. Into this diazotized mixture are introduced 25 parts of 2-amino-8-hydroxynaphthalene-6-sulfonic acid suspended in dilute acetic acid. An excess of sodium acetate is added thereto and the mixture is stirred until the coupling is complete. The separated monoazo dye is filtered by suction and heated for about 1 hour to 90° C. with 1200 parts of a 1% sodium hydroxide solution. The dye is then isolated, dissolved in water and further diazotized in the usual manner. Into the diazotized solution 25 parts of 2-methylamino - 8 - hydroxynaphthalene - 6 - sulfonic acid suspended in dilute acetic acid, are entered. After the coupling is complete, the dye is filtered by suction and dried. The dye dissolves in water to a clear greenish-blue solution and dyes viscose artificial silk an even, very clear greenish-blue tint of good fastness to light.

As free acid it corresponds to the formula

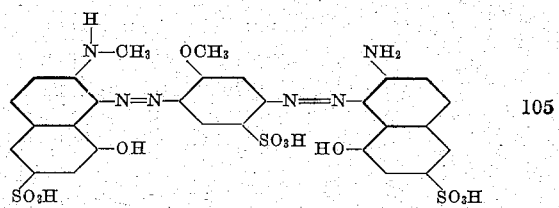

*Example 4.*—The monoazo dye obtainable according to the first step described in the foregoing example, is diazotized after saponification of the acetylamino group and 22 parts of 2-amino-8-hydroxynaphthalene-6-sulfonic acid suspended in dilute acetic acid are added to the diazo compound. After working up the reaction product obtained in the manner described a disazo dye is produced corresponding to the formula

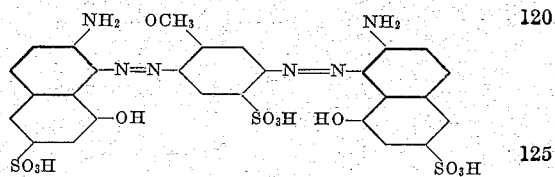

It dyes viscose silk clear green-blue tints, greener than that obtainable according to Example 1.

*Example 5.*—26 parts of 5-amino-2-acetylamino-1-methoxybenzene-4-sulfonic acid are combined in an acetic acid solution with 2-amino-8-hydroxynaphthalene-6-sulfonic acid as described in Example 3. The acetyl group is split off, the monoazo dye is further diazotized and combined with 2-n. butylamino-naphthalene-7-sulfonic acid in the presence of sodium carbonate. The dye is worked up in the usual manner. It dissolves in water to a blue solution and dyes viscose artificial silk an even, clear blue tint of good fastness to light.

As free acid it corresponds to the formula

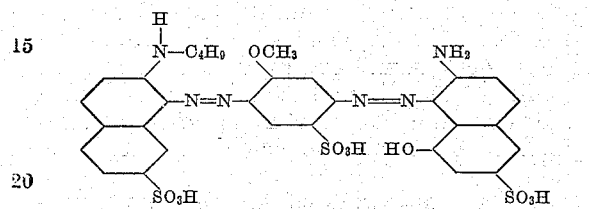

*Example 6.*—The monoazo dye obtainable according to Example 5 is coupled, instead of with 2-n. butylamino-naphthalene-7-sulfonic acid, with dimethylaniline in an acetic acid solution. A dye is obtained which dissolves in water to a blue solution and dyes viscose artificial silk an even, blue tint of good fastness to light.

As free acid it corresponds to the formula

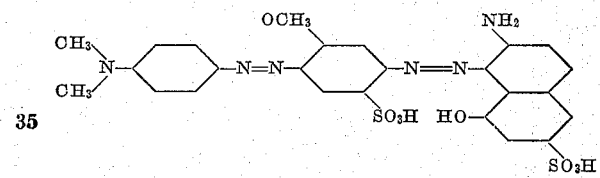

What we claim is:—

1. The new secondary disazo dyes corresponding as free acids to the general formula

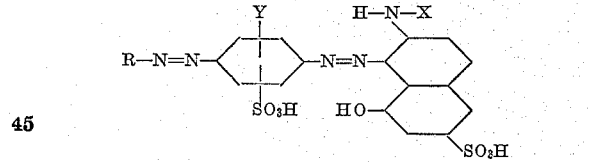

wherein R means the radicle of an amino compound of the benzene or naphthalene series which can no longer be diazotized, Y stands for H or $OCH_3$ and wherein X means H, alkyl or phenyl, these dyes dyeing artificial viscose silk bright, clear and even reddish-blue to greenish-blue tints of excellent fastness to light.

2. The new secondary disazo dyes corresponding as free acids to the general formula

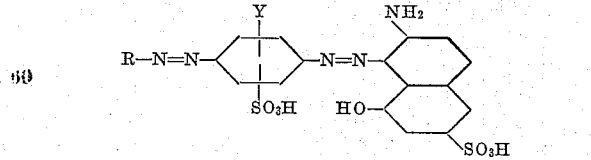

wherein R means the radicle of an alkylated aniline or a β-naphthylamine compound, Y stands for H or $OCH_3$, these dyes dyeing artificial viscose silk bright, clear and even reddish-blue to greenish-blue tints of excellent fastness to light.

3. The new secondary disazo dyes corresponding as free acids to the general formula

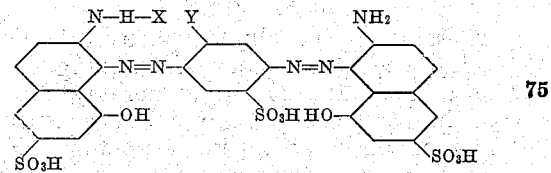

wherein X means H or methyl and Y stands for H or $OCH_3$, these dyes dyeing artificial viscose silk bright, clear and even greenish-blue tints of excellent fastness to light.

4. The new secondary disazo dye corresponding as free acid to the formula

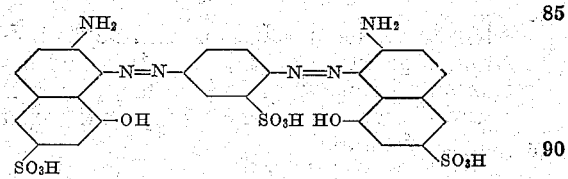

this dye dyeing artificial viscose silk bright, clear and even greenish-blue tints of excellent fastness to light.

5. The new secondary disazo dye corresponding as free acid to the formula

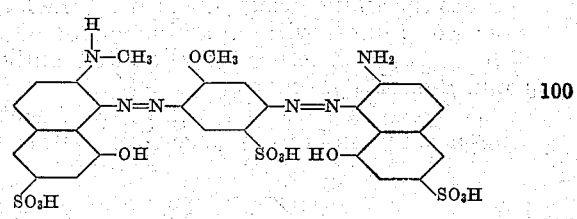

this dye dyeing artificial viscose silk bright, clear and even greenish-blue tints of excellent fastness to light.

6. The new secondary disazo dye corresponding as free acid to the formula

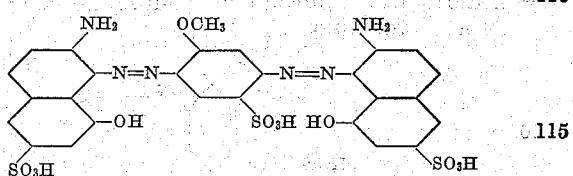

this dye dyeing artificial viscose silk bright, clear and even greenish-blue tints of excellent fastness to light.

7. The process which comprises diazotizing a compound of the general formula

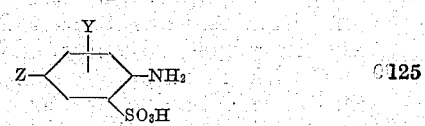

wherein Z means $NO_2$ or NH-acyl, and Y stands for H or $OCH_3$, coupling the diazo compound formed in an acid medium with a β-aminooxynaphthalene compound of the general formula

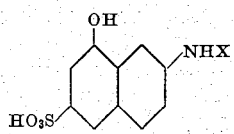

wherein X means alkyl or phenyl, converting Z into the amino group, diazotizing the latter and coupling it with an amino compound of the group consisting of aminobenzenes and aminonaphthalenes which after formation of the dye can no longer be diazotized.

8. The process which comprises diazotizing a compound of the general formula

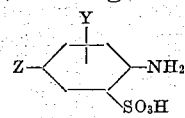

wherein Z means $NO_2$ or NH-acyl, and Y stands for H or $OCH_3$, coupling the diazo compound formed in an acid medium with a β-aminooxynaphthalene compound of the general formula

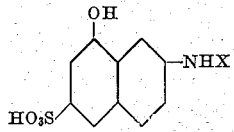

wherein X means alkyl or phenyl, converting Z into the amino group, diazotizing the latter and coupling it with an amino compound of the group consisting of alkylated anilines and β-naphthylamines.

9. The process which comprises diazotizing a compound of the general formula

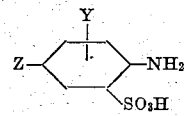

wherein Z means $NO_2$ or NH-acyl, and Y stands for H or $OCH_3$, coupling the diazo compound formed in an acid medium with a β-aminooxynaphthalene compound of the general formula

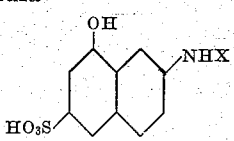

wherein X means alkyl or phenyl, converting Z into the amino group, diazotizing the latter and coupling it with an amino compound likewise in an acid medium with a 2-amino-8-hydroxynaphthalene-6-sulfonic acid.

10. The process which comprises diazotizing 1-amino-4-nitrobenzene-2-sulfonic acid, coupling the diazo compound in an acid medium with 2-amino-8-hydroxynaphthalene-6-sulfonic acid, reducing the nitro group of the mono azo-dye into the amino group, diazotizing the latter and coupling it again with 2-amino-8-hydroxynaphthalene-6-sulfonic acid in an acid medium.

11. The process which comprises diazotizing 5-amino-2-acetylamino-1-methoxybenzene-4-sulfonic acid, coupling the diazo compound in an acid medium with 2-amino-8-hydroxynaphthalene 6-sulfonic acid, saponifying the acetyl-amino group of the monoazo dye obtained, diazotizing the amino dye obtained and coupling it with 2-methylamino-8-hydroxynaphthalene-6-sulfonic acid in an acid medium.

12. The process which comprises diazotizing 5-amino-2-acetylamino-1-methoxybenzene-4-sulfonic acid, coupling the diazo compound in an acid medium with 2-amino-8-hydroxynaphthalene-6-sulfonic acid, saponifying the acetylamino group of the monoazo dye obtained, diazotizing the amino dye obtained and coupling it with 2-amino-8-hydroxynaphthalene-6-sulfonic acid in an acid medium.

In testimony whereof, we affix our signatures.

WERNER LANGE.
MAX RAECK.